United States Patent
Chen et al.

(10) Patent No.: US 8,170,726 B2
(45) Date of Patent: May 1, 2012

(54) SYSTEM AND METHOD FOR ROAD ANGLE ESTIMATION

(75) Inventors: Tsung-Lin Chen, Taipei (TW); Ling-Yuan Hsu, Tainan (TW)

(73) Assignee: National Chiao Tung University, Hsinchu (TW)

( * ) Notice: Subject to any disclaimer, the term of this patent is extended or adjusted under 35 U.S.C. 154(b) by 616 days.

(21) Appl. No.: 12/390,129

(22) Filed: Feb. 20, 2009

(65) Prior Publication Data

US 2010/0100272 A1   Apr. 22, 2010

(30) Foreign Application Priority Data

Oct. 16, 2008   (TW) .............................. 97139687 A

(51) Int. Cl.
*G06F 17/00* (2006.01)
(52) U.S. Cl. ................. 701/1; 701/36; 702/151
(58) Field of Classification Search .................. None
See application file for complete search history.

(56) References Cited

U.S. PATENT DOCUMENTS

| | | | |
|---|---|---|---|
| 5,446,658 A | 8/1995 | Pastor et al. | |
| 6,351,694 B1 * | 2/2002 | Tseng et al. | 701/1 |
| 6,714,851 B2 | 3/2004 | Hrovat | |
| 6,804,584 B2 * | 10/2004 | Tseng et al. | 701/1 |
| 7,451,549 B1 * | 11/2008 | Sodhi et al. | 33/356 |
| 2006/0276939 A1 | 12/2006 | Ameen | |
| 2008/0082246 A1 * | 4/2008 | Brown et al. | 701/91 |

OTHER PUBLICATIONS

Ryu and Gerdes, J.C., "Integrating Inertial Sensors with GPS for Vehicle Dynamics Control," Dynamic Systems, Measurement, and Control, 2004.
Tseng, H. E., "Dynamic Estimation of Road Bank Angle," Vehicle System Dynamics, 2001.
Hahn, J.O., et al., "Real Time Identification of Road Bank Angle Using Differential GPS," IEEE Transactions on Control systems Technology, 2004.

* cited by examiner

*Primary Examiner* — Michael J. Zanelli
(74) *Attorney, Agent, or Firm* — Ladas & Parry, LLP

(57) ABSTRACT

A system and method for estimating road angles of a road on which a moving body is traveling are disclosed. The road angle estimation system includes: a sensing module adapted to be mounted on the moving body to detect a plurality of pieces of measurement information associated with the moving body; and a calculating module coupled to the sensing module to receive the pieces of measurement information therefrom. The calculating module simultaneously calculates an estimated bank angle and an estimated grade angle on the basis of the pieces of measurement information, a plurality of support parameters, and a plurality of user control parameters.

14 Claims, 5 Drawing Sheets

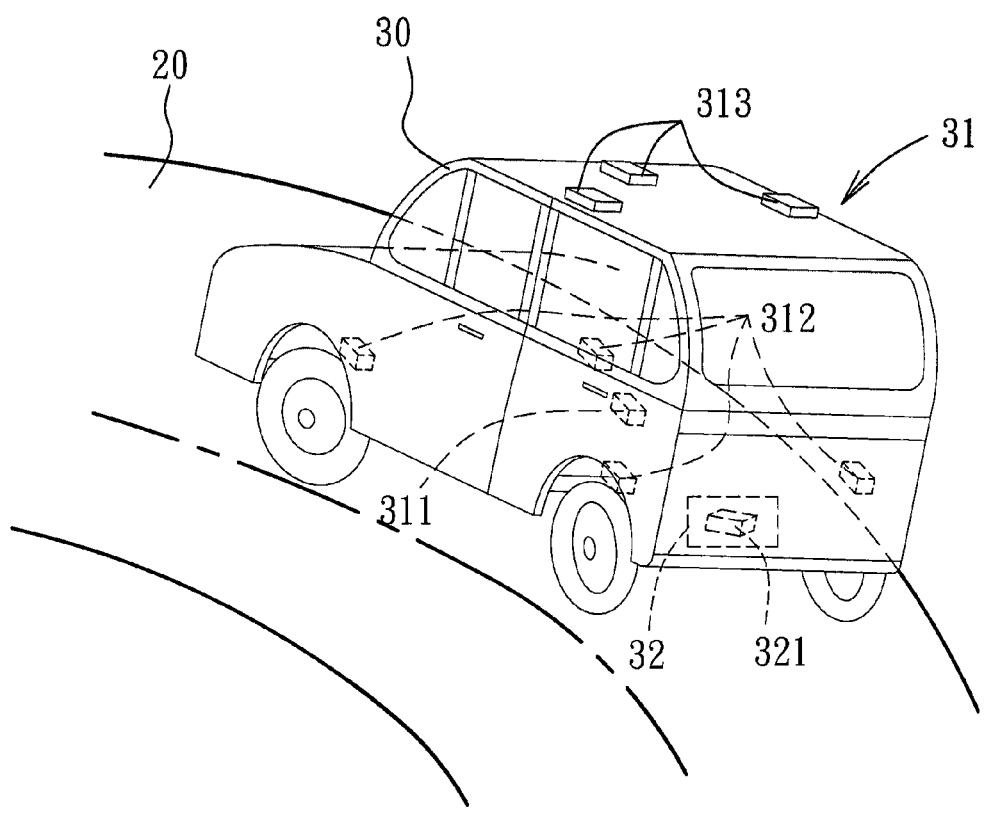
F I G. 1

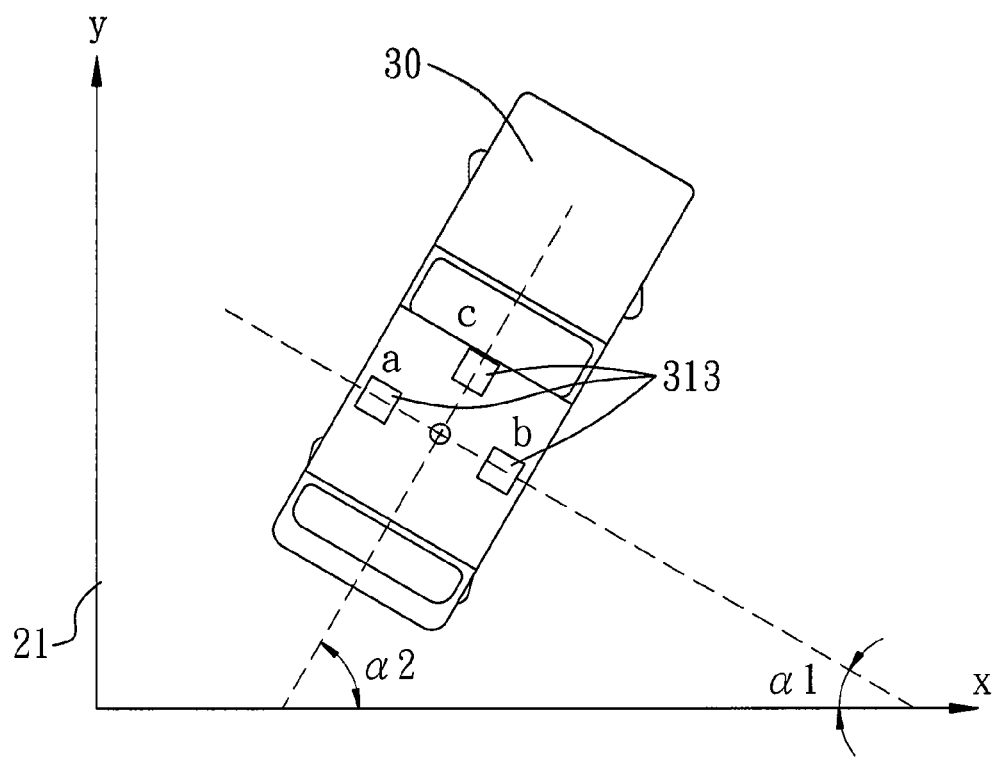
F I G. 4

SYSTEM AND METHOD FOR ROAD ANGLE ESTIMATION

CROSS-REFERENCE TO RELATED APPLICATION

This application claims priority of Taiwanese Application No. 097139687, filed on Oct. 16, 2008.

BACKGROUND OF THE INVENTION

1. Field of the Invention

The present invention relates to a system and method for road angle estimation.

2. Description of the Related Art

Information related to road angle may be used by vehicular control systems to enhance safety and performance.

Examples of patents and published patent applications that disclose conventional road angle estimation techniques include the following: U.S. Pat. No. 5,446,658, entitled "Method and Apparatus For Estimating Incline and Bank Angles of a Road Surface"; U.S. Pat. No. 6,714,851, entitled "Method For Road Grade/Vehicle Pitch Estimation"; and US Patent Application Publication No. 2006/0276939, entitled "Real-time Determination of Grade and Superelevation Angles of Road." Examples of non-patent publications that disclose conventional road angle estimation techniques include the following: "Integrating Inertial Sensors With GPS For Vehicle Dynamics Control" by Ryu and Gerdes J. C. and published in the June 2004 issue of "Dynamic Systems, Measurement, and Control"; "Dynamic Estimation of Road Bank Angle" by Tseng H. E. and published in 2001 in "Vehicle System Dynamics"; and "Real-time Identification of Roadbank Angle Using Differential GPS" by Hahn J. O., Rajamani R., You S. H., and Lee K. I. and published in 2004 in "IEEE Transactions on Control Systems Technology."

However, conventional techniques for estimating road angle, such as those listed above, have some or all of the following disadvantages:

1. Many existing techniques utilize empirical formulas to estimate road angle. However, such methods are imprecise, and are not applicable to a road surface having road angles that vary rapidly and frequently.

2. Existing techniques estimate two road angles separately, and are unable to estimate two road angles simultaneously.

3. Current techniques require the use of four or more sensors for road angle estimation.

4. Road angles defined by conventional techniques are relative to the front of the vehicle, and such a manner of defining road angles is different from traditional Euler angles. Hence, even if two angle values are obtained, road conditions on a global (or terrestrial) reference frame cannot be described sufficiently rapidly.

SUMMARY OF THE INVENTION

Therefore, the object of the present invention is to provide a system and method for road angle estimation that can overcome the aforesaid drawbacks associated with the prior art.

In one aspect of the present invention, the road angle estimation system estimates road angles of a road on which a moving body is traveling. The road angle estimation system comprises: a sensing module adapted to be mounted on the moving body to detect a plurality of pieces of measurement information associated with the moving body; and a calculating module coupled to the sensing module to receive the pieces of measurement information therefrom. The calculating module simultaneously calculates an estimated bank angle and an estimated grade angle on the basis of the pieces of measurement information, a plurality of support parameters, and a plurality of user control parameters.

In another aspect of the present invention, the road angle estimation method comprises: a) detecting a plurality of pieces of measurement information associated with the moving body through a sensing module mounted on the moving body; and b) through a calculating module mounted on the moving body and coupled to the sensing module, simultaneously calculating an estimated bank angle and an estimated grade angle on the basis of the pieces of measurement information, a plurality of support parameters, and a plurality of user control parameters.

BRIEF DESCRIPTION OF THE DRAWINGS

Other features and advantages of the present invention will become apparent in the following detailed description of the preferred embodiment with reference to the accompanying drawings, of which:

FIG. 1 is a schematic diagram of a system for road angle estimation according to a preferred embodiment of the present invention, in which the system is shown in a state mounted on a moving body;

FIG. 4 is a schematic diagram, illustrating relative positioning of a plurality of receiving antennas of the preferred embodiment, in which the receiving antennas are shown in a state mounted on the moving body of FIG. 1.

DETAILED DESCRIPTION OF THE PREFERRED EMBODIMENT

Figure 2:
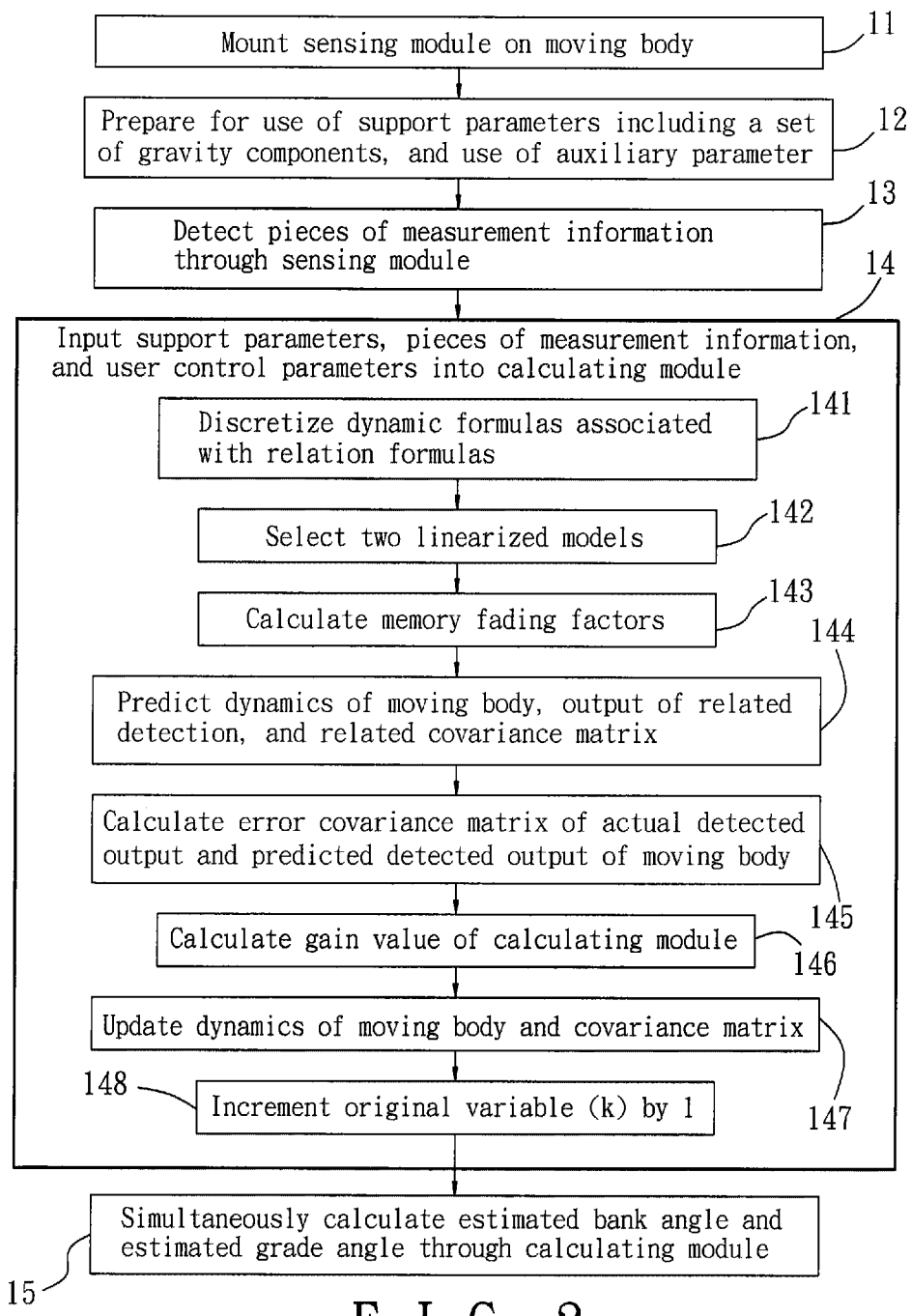
FIG. 2 is a flowchart of a method for road angle estimation according to a preferred embodiment of the present invention.

Referring to FIG. 1, a system for road angle estimation according to a preferred embodiment of the present invention is used to estimate road angles of a road 20 (see FIG. 3) on which a moving body 30 is traveling. The system includes a sensing module 31 and a calculating module 32.

The sensing module 31 is adapted to be mounted on the moving body 30 to detect a plurality of pieces of measurement information associated with the moving body 30. In the preferred embodiment, the sensing module 31 includes an accelerometer 311, a plurality of suspension displacement sensors 312, and a plurality of receiving antennas 313 of a differential global positioning system (DGPS). The moving body 30 may be a vehicle, as shown in FIG. 1, and the accelerometer 311, the suspension displacement sensors 312, and the receiving antennas 313 of the sensing module 31 may be mounted on the vehicle in the manner shown in FIG. 1. In the preferred embodiment, the pieces of measurement information detected by the sensing module 31 include a suspension displacement quantity, a lateral acceleration, a longitudinal speed, and a yaw angle of the moving body 30. It is noted that different or additional sensing devices may be included in the sensing module 31 to generate the above and additional pieces of measurement information, and the sensing module 31 and the pieces of measurement information detected thereby are not limited to what has been disclosed herein.

The calculating module 32 is coupled to the sensing module 31 to receive the pieces of measurement information therefrom. The calculating module 32 simultaneously calculates estimated road angles on the basis of the pieces of measurement information, a plurality of support parameters, and a plurality of user control parameters. In the preferred embodiment, the estimated road angles include an estimated bank angle and an estimated grade angle.

The road angles determine the magnitudes of the components of the earth's gravity exerted on the moving body 30, and these gravity components directly affect the dynamics of the moving body 30. Therefore, it may be stated that the gravity components are the media through which the road angles affect the dynamics of the moving body 30. In the preferred embodiment, the support parameters include a set of gravity components comprised of a first gravity component, a second gravity component, and a third gravity component. In other embodiments, the support parameters include a set of road angles comprised of a road bank angle and a road grade angle.

Moreover, in the preferred embodiment, the user control parameters include a steering angle, a throttle opening value, and a braking force value.

Referring FIGS. 1 to 4, a method for road angle estimation according to a preferred embodiment of the present invention will now be described. The method is performed by the system of the preferred embodiment described above.

First, in step 11, the sensing module 31 is mounted on the moving body 30.

Next, in step 12, preparations are made for use of the support parameters, and a plurality of auxiliary parameters.

In the preferred embodiment, the support parameters include a first gravity component, a second gravity component, and a third gravity component, which are represented by $G_x^a$, $G_y^a$, $G_z^a$, respectively.

Figure 3:
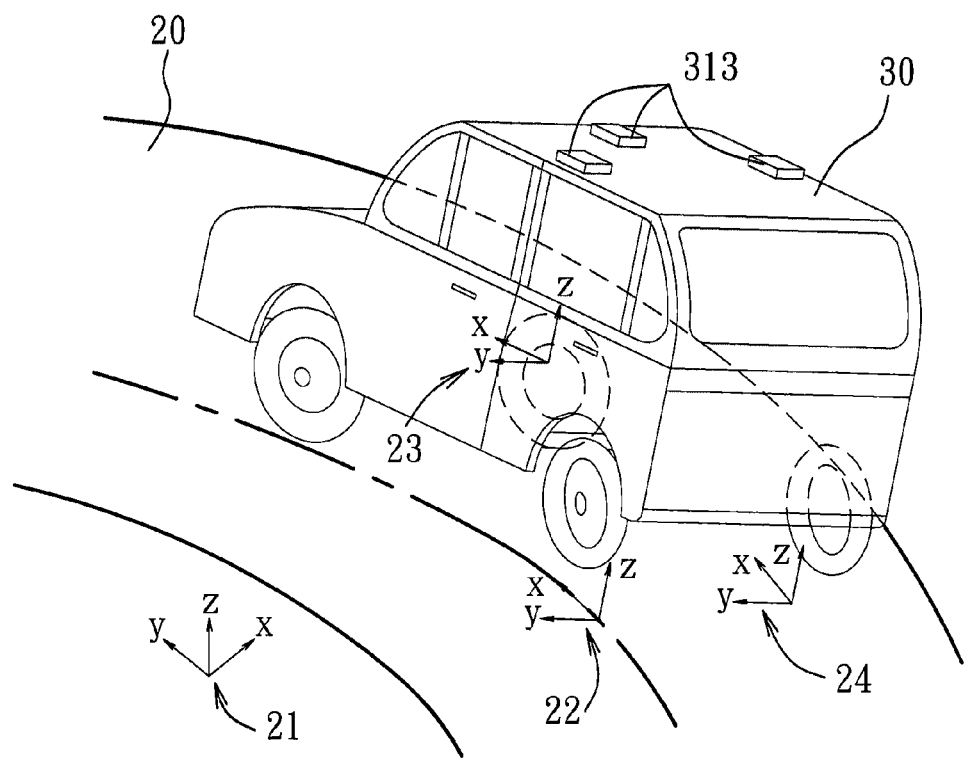
FIG. 3 is a schematic diagram, illustrating four coordinate systems used in the preferred embodiment.

In the preferred embodiment, the auxiliary parameters include four reference frames, and first and second sets of Euler angles. Referring to FIG. 3, the four reference frames are a global reference frame ($E^g$) 21, a road reference frame ($E^r$) 22, a moving body reference frame ($E^b$) 23, and an auxiliary reference frame ($E^a$) 24.

The first set of Euler angles is used for describing the angular relation of the rotational orientation of the moving body 30 relative to the road reference frame 22, and the second set of Euler angles is used for describing the angular relation of topological variations of the road 20 relative to the global reference frame 21. The first set of Euler angles in this embodiment indicates a vehicle yaw angle, a vehicle pitch angle, and a vehicle roll angle, which are represented respectively as $(\psi, \theta, \phi)$. The second set of Euler angles in this embodiment indicates a road curve angle, a road grade angle, and a road bank angle, which are represented respectively as $(\psi_r, \theta_r, \phi_r)$. Moreover, since the road curve angle does not affect the dynamics of the moving body 30, it is assumed that the road curve angle is zero in the preferred embodiment, that is, $\psi_r=0$.

It is to be noted that the relationship of the gravity components with the road angles and the vehicle yaw angle is shown in relation formula (1) below:

$$\begin{bmatrix} G_x^a \\ G_y^a \\ G_z^a \end{bmatrix} = \begin{bmatrix} \cos\psi & \sin\psi & 0 \\ -\sin\psi & \cos\psi & 0 \\ 0 & 0 & 1 \end{bmatrix} \begin{bmatrix} 1 & 0 & 0 \\ 0 & \cos\phi_r & \sin\phi_r \\ 0 & -\sin\phi_r & \cos\phi_r \end{bmatrix}$$

$$\begin{bmatrix} \cos\theta_r & 0 & -\sin\theta_r \\ 0 & 1 & 0 \\ \sin\theta_r & 0 & \cos\theta_r \end{bmatrix} \begin{bmatrix} 0 \\ 0 \\ -g \end{bmatrix}$$

Relation formula (1)

In addition, since there is no hardware equipment mounted in a vehicle capable of obtaining road angular rates, it is not possible to use mathematical equations to describe real-time changes in road angle. Nevertheless, since the road angular rate in practice is slower than the dynamics of the moving body 30, the support parameters added in step 12 may be assumed to be constants within a predetermined sampling period, that is, the variation of $G_x^a$, $G_y^a$, and $G_z^a$ may be assumed to be 0.

Next, in step 13, the sensing module 31 detects the pieces of measurement information associated with the moving body 30. In the preferred embodiment, the sensing module 31 detects the pieces of measurement information.

Subsequently, in step 14, the support parameters, the pieces of measurement information, and the user control parameters are input into the calculating module 32. In the preferred embodiment, the calculating module 32 includes an extended Kalman filter 321, and performs calculations in cooperation with a fading memory technique and a dynamic formula for describing the moving body 30, so as to compensate for errors caused by setting the support parameters to constants in step 12. It is to be noted that the dynamic formula for the moving body 30 is as follows:

$$\dot{x} = fc(x_{other}, G_x^a, G_y^a, G_z^a, u)$$

where (x) indicates the dynamics of the moving body 30 and the previously assumed three gravity components of the support parameters, ($x_{other}$) indicates dynamic values other than the gravity components, (u) indicates the steering angle, the throttle opening value, and the braking force value, and fc(·) is a system dynamic formula of the moving body 30 which is expressed in a continuous time manner.

In practice, the calculating module 32 may also employ other conventional techniques, or techniques that have yet to be developed, and the present invention is not limited in this regard.

It is further noted that, in the preferred embodiment, in addition to the suspension displacement quantity, the lateral acceleration, the longitudinal speed, and the yaw angle of the pieces of measurement information detected in step 13, the sensing module 31 may be configured to accommodate a plurality of sensors to obtain the steering angle, the throttle opening value, and the braking force value of the user control parameters of step 14. The relationship between the measurement values and the dynamics of the moving body 30 is expressed by relation formulas (2)~(4) below:

$$\ddot{y}_m^g = (\ddot{x}^a - \dot{y}^a\dot{\psi} + G_x^a)\sin\phi\sin\theta + (\ddot{y}^a + \dot{x}^a\dot{\psi} + G_y^a)\cos\phi + (\ddot{z}^a + G_z^a)\sin\phi\cos\theta$$

Relation formula (2)

Relation formula (2) expresses the lateral acceleration ($\ddot{y}_m^g$) measured by the accelerometer 311 which is mounted at the center of mass of the moving body 30. In relation formula (2), $x^a$, $y^a$, $z^a$ represent linear displacement magnitudes of the center of mass of the moving body 30 observed from the auxiliary reference frame 24, and are linear displacement magnitudes respectively in the longitudinal direction, the lateral direction, and the vertical direction.

$$H_{1,m}^a = -z^a + l_f\sin\theta - t_f\cos\theta\sin\phi$$

$$H_{2,m}^a = -z^a + l_f\sin\theta + t_f\cos\theta\sin\phi$$

$$H_{3,m}^a = -z^a - l_r\sin\theta + t_r\cos\theta\sin\phi$$

$$H_{4,m}^a = -z^a - l_r\sin\theta - t_r\cos\theta\sin\phi$$

Relation formula (3)

Relation formula (3) expresses spring displacement magnitudes ($H_{1,m}^a$, i=1~4) of a suspension system (not shown) of the moving body 30 measured by the suspension displacement sensors 312, where ($t_f$) and ($t_r$) represent respectively the half-length between the two front wheels and the half-length between the two rear wheels of the moving body 30

(assuming the moving body 30 is a vehicle), and ($l_f$) and ($l_r$) represent respectively the distance between the center of mass of the moving body 30 and the front axle and the distance between the center of mass of the moving body 30 and the rear axle.

Relation formula (4)

When there are two of the DGPS receiving antennas 313, as indicated by (a) and (b) in FIG. 4, relation formula (4) is expressed as follows:

$$\psi_m = 90° - \alpha_1 \text{ and } \dot{x}_m^a = 0.5(V_{a,xy} + V_{b,xy})\cos\psi_m$$

When there are three of the DGPS receiving antennas 313, as indicated by (a), (b), and (c) in FIG. 4, relation formula (4) is expressed as follows:

$$\psi_m = \alpha_2 \text{ and } \dot{x}_m^a = 0.5(V_{a,xy} + V_{b,xy})\cos\psi_m$$

Relation formulas (4) utilize the DGPS receiving antennas 313 mounted on the moving body 30 and cooperate with a differential global positioning system (not shown) to calculate a relative position and a relative speed between each of the receiving antennas 313 and a measuring base station (not shown), i.e., the global reference frame 21, and to further calculate the yaw angle ($\psi_m$) and the longitudinal speed ($\dot{x}_m^a$) of the moving body 30 (vehicle), where ($\alpha_1$) and ($\alpha_2$) represent the auxiliary angles of the yaw angle of the moving body 30 as shown in FIG. 4, and ($V_{a,xy}$) and ($V_{b,xy}$) represent relative speeds measured by the (a) and (b) receiving antennas 313, respectively, on the (x-y) plane.

The parameters mentioned in step 13 and step 14 can be obtained according to the aforementioned dynamic formulas and relation formulas of the moving body 30. After the parameters needed for subsequent operation of the calculating module 32 are obtained, detailed processes related to the fading memory technique used in cooperation with the extended Kalman filter 321 of the preferred embodiment, i.e., sub-steps of step 14, are performed, as outlined in FIG. 2.

First, in sub-step 141, the dynamic formulas associated with relation formulas (1) to (4) are discretized to become:

$$x_{k+1} = f_d(x_k, u_k) + w_k \text{ and } y_{k+1} = h_d(x_k) + v_k$$

Next, in sub-step 142, two linearized models are selected as follows:

$$F_k = \frac{\partial f_d(x, u)}{\partial x}\bigg|_{x_k = \hat{x}_{k|k}} \text{ and } H_k = \frac{\partial h_d(x)}{\partial x}\bigg|_{x_k = \hat{x}_{k|k}}$$

Next, in sub-step 143, memory fading factors are calculated as follows:

$$M_{k+1} = H_{k+1} F_k P_{k|k-1} F_k^T H_{k+1}^T$$

$$N_{k+1} = H_{k+1} P_{k|k} H_{k+1}^T - H_{k+1} Q_k H_{k+1}^T$$

$$\lambda_{k+1} = \max(1, \text{trace}(N_{k+1})/\text{trace}(M_{k+1}))$$

Next, in sub-step 144, the dynamics of the moving body 30, an output of related detection, and a related covariance matrix are predicted as follows:

$$\hat{x}_{k+1} = f(\hat{x}_k, u_k), \hat{y}_{k+1} = h(\hat{x}_k), P_{k+1|k} = \lambda_{k+1} F_k R_{k|k} F_k^T + Q_k$$

Subsequently, in sub-step 145, an error covariance matrix of the actual detected output and the predicted detected output of the moving body 30 is calculated as follows:

$$S_{k+1} = H_{k+1} P_{k+1|k} H_{k+1}^T + R_{k+1}$$

Next, in sub-step 146, again value of the calculating module 32 is calculated as follows:

$$K_{k+1} = P_{k+1|k} H_{k+1}^T S_{k+1}^{-1}$$

Next, in sub-step 147, the dynamics of the moving body 30 and the covariance matrix are updated as follows:

$$\hat{x}_{k+1|k+1} = \hat{x}_{k+1|k} + K_{k+1}(y_{k+1} - \hat{y}_{k+1}), P_{k+1|k+1} = P_{k+1|k} - K_{k+1} S_{k+1} K_{k+1}^{-1}$$

Lastly, in sub-step 148, the original variable (k) is incremented by 1, and sub-steps 141~148 are repeated until estimation is completed.

The parameters used in sub-steps 141~148 are further detailed below.

($x_k$) represents a kth sampling value over a discrete time period of the system dynamics (x) of the moving body 30. ($u_k$) represents a kth sampling value over a discrete time period of the system input (u) of the moving body 30. ($y_k$) represents a kth sampling value over a discrete time period of the output of the sensing module 31 including the lateral acceleration of the moving body 30, the suspension displacement quantity, the yaw angle of the moving body 30, and the longitudinal speed of the moving body 30. fd(·) represents a system dynamic formula of the moving body 30 over a discrete time period. hd(·) represents an output formula of the sensing module 31 over a discrete time period. ($w_k$) and ($v_k$) represent respectively an uncertain quantity of the system of the moving body 30 and a noise (assumed to be white noise herein) of the sensing module 31. ($F_k$) represents a linearized dynamic formula of the moving body 30 calculated over a kth sampling time. ($H_k$) represents a linearized system output formula of the moving body 30 calculated over a kth sampling time. ($P_{k+1|k}$) represents a dynamic covariance matrix of the moving body 30, where (k+1|k) represents information of a (k+1)th sampling time estimated during the (kth) sampling time. ($S_k$) represents an associative outputted error covariance matrix calculated during the kth sampling time. ($K_k$) represents a gain of the extended Kalman filter 321 in the calculating module 32 calculated during the (kth) sampling time.

Lastly, in step 15, through the calculating module 32 mounted on the moving body 30 and coupled to the sensing module 31, the estimated bank angle and the estimated grade angle are simultaneously calculated on the basis of the pieces of measurement information, the support parameters, and the user control parameters. In the preferred embodiment, the calculating module 32 simultaneously calculates the estimated bank angle and the estimated grade angle with reference to the auxiliary parameters.

Figure 5:
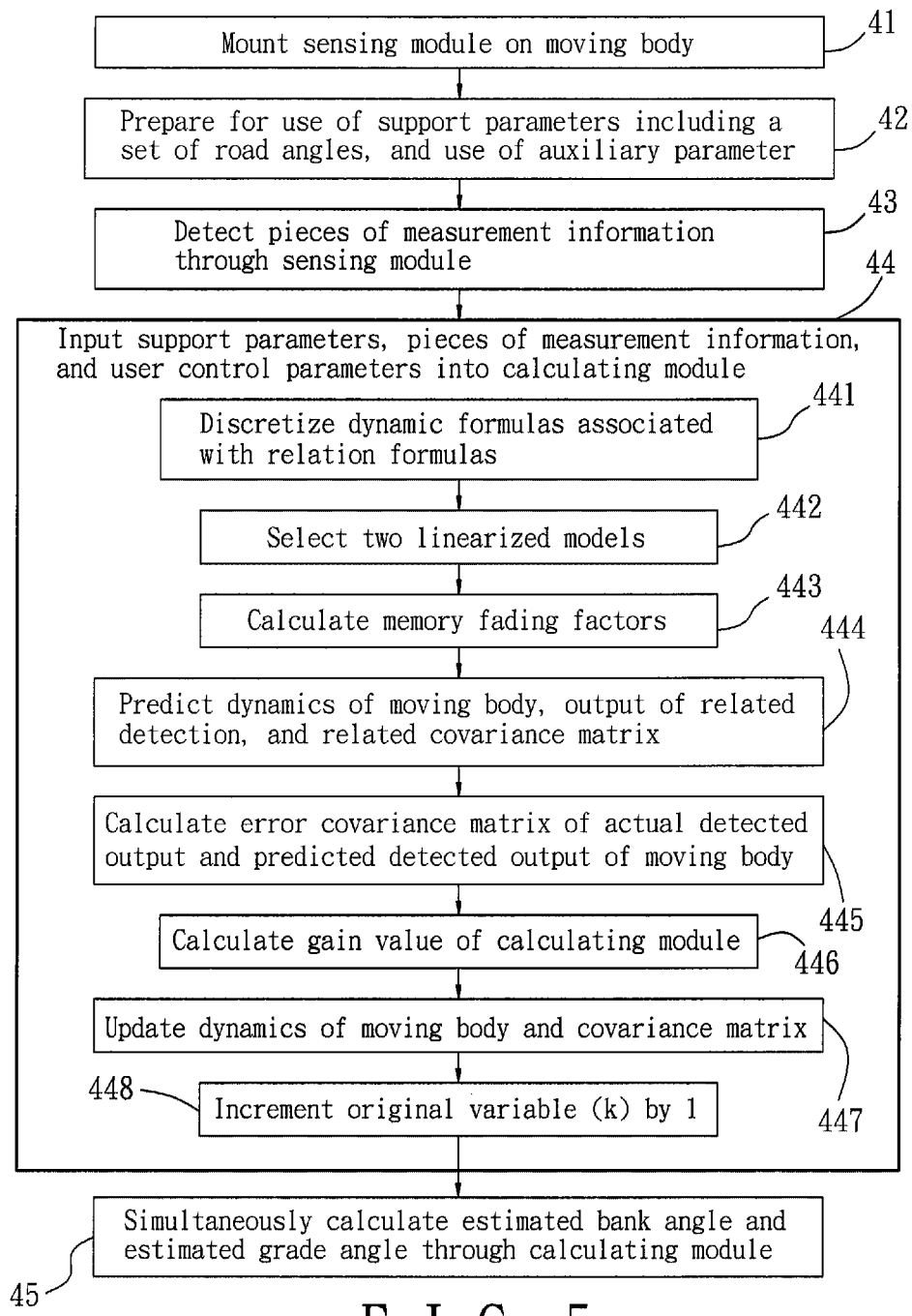
FIG. 5 is a flowchart of a modified example of the method for road angle estimation according to the preferred embodiment of the present invention.

FIG. 5 shows the steps involved in a modified example of the method for road angle estimation according to the present invention.

The modified example of the method for road angle estimation is substantially the same as the method for road angle estimation of the preferred embodiment described above. However, in the modified example, step 42, which corresponds to step 12 of the preferred embodiment, is different. In particular, the support parameters added in step 12 and originally assumed to be three gravity component values in the preferred embodiment are replaced in the modified example by a road bank angle and a road grade angle as indicated in FIG. 5. (A road curve angle is also included in this replacement of the gravity component values but is not considered since the road curve angle is set to zero due to the fact that this parameter does not affect the dynamics of the moving body 30 as described above.) Through such an alternative approach, there is no need to indirectly compute the related road bank angle and road grade angle using relation formula (1) in step 12, and it is possible to simply assume these parameters to be constants before proceeding with the subsequent steps.

In the system and method for road angle estimation of this invention, through use of the support parameters, the pieces of measurement information, and the user control parameters, as well as the fading memory technique and the extended Kalman filter 321 by the calculating module 32, more efficient and accurate estimation of road angle changes are simultaneously obtained using a smaller number of sensors (i.e., the accelerometer 311, the suspension displacement sensors 312, and the DGPS receiving antennas 313).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A road angle estimation system for estimating road angles of a road on which a moving body is traveling, said road angle estimation system comprising: a sensing module adapted to be mounted on the moving body to detect a plurality of pieces of measurement information associated with the moving body; and a calculating module coupled to said sensing module to receive the pieces of measurement information therefrom, said calculating module simultaneously calculating an estimated bank angle and an estimated grade angle on the basis of the pieces of measurement information, a plurality of support parameters, and a plurality of user control parameters.

2. The road angle estimation system of claim 1, wherein: the pieces of measurement information include a suspension displacement quantity, a lateral acceleration, a longitudinal speed, and a yaw angle of the moving body; and the user control parameters include a steering angle, a throttle opening value, and a braking force value.

3. The road angle estimation system of claim 2, wherein the support parameters include one of a set of gravity components and a set of road angles, the set of gravity components including a first gravity component, a second gravity component, and a third gravity component, and the set of road angles including a road bank angle and a road grade angle.

4. The road angle estimation system of claim 3, wherein said sensing module includes an accelerometer, a suspension displacement sensor, and a receiving antenna of a differential global positioning system.

5. The road angle estimation system of claim 4, wherein said calculating module includes an extended Kalman filter, and performs calculations in cooperation with a fading memory technique and a dynamic formula for describing the moving body.

6. The road angle estimation system of claim 5, wherein the support parameters are constants.

7. A road angle estimation method for estimating road angles of a road on which a moving body is traveling, said road angle estimation method comprising: a) detecting a plurality of pieces of measurement information associated with the moving body through a sensing module mounted on the moving body; and b) through a calculating module mounted on the moving body and coupled to the sensing module, simultaneously calculating an estimated bank angle and an estimated grade angle on the basis of the pieces of measurement information, a plurality of support parameters, and a plurality of user control parameters.

8. The road angle estimation method of claim 7, wherein: in step a), the pieces of measurement information include a suspension displacement quantity, a lateral acceleration, a longitudinal speed, and a yaw angle of the moving body; and in step b), the user control parameters include a steering angle, a throttle opening value, and a braking force value.

9. The road angle estimation method of claim 8, wherein, in step (b), the support parameters include one of a set of gravity components and a set of road angles, the set of gravity components including a first gravity component, a second gravity component, and a third gravity component, and the set of road angles including a road bank angle and a road grade angle.

10. The road angle estimation method of claim 9, wherein the sensing module includes an accelerometer, a suspension displacement sensor, and a receiving antenna of a differential global positioning system.

11. The road angle estimation method of claim 10, wherein the calculating module includes an extended Kalman filter, and performs calculations in cooperation with a fading memory technique and a dynamic formula for describing the moving body.

12. The road angle estimation method of claim 11, wherein, in step b), the support parameters are constants.

13. The road angle estimation method of claim 7, wherein: in step a), the pieces of measurement information are detected with reference to a plurality of auxiliary parameters; and in step b), the estimated bank angle and the estimated grade angle are simultaneously calculated with reference to the auxiliary parameters.

14. The road angle estimation method of claim 13, wherein the auxiliary parameters include four reference frames and two sets of Euler angles, the reference frames including a global reference frame, a road reference frame, a moving body reference frame, and an auxiliary reference frame, one of the sets of Euler angles being used for describing an angular relation of the rotational orientation of the moving body relative to the road reference frame, and the other one of the sets of Euler angles being used for describing an angular relation of topological variations of the road relative to the global reference frame.

* * * * *